United States Patent [19]
Cathers et al.

[11] Patent Number: 5,511,092
[45] Date of Patent: Apr. 23, 1996

[54] DATA RECOVERY TECHNIQUE WHICH AVOIDS A FALSE CONVERGENCE STATE

[75] Inventors: Frederick R. Cathers, Baltimore; Glenn D. Fowler, Canal Winchester; J. Arthur Grandle, Reynoldsburg; Ronald Hartung, Gahanna, all of Ohio

[73] Assignee: AT&T Corp., Murray Hill, N.J.

[21] Appl. No.: 154,197

[22] Filed: Nov. 17, 1993

[51] Int. Cl.$^6$ ............... H04L 27/01; G06F 17/10; H04B 3/04; H04B 7/005
[52] U.S. Cl. .................... 375/232; 364/724.2
[58] Field of Search ............ 375/14, 232; 364/724.2

[56] References Cited

U.S. PATENT DOCUMENTS

| | | | |
|---|---|---|---|
| 4,567,599 | 1/1986 | Mizoguchi | 375/14 |
| 5,173,925 | 12/1992 | Mizoguchi | 375/14 |
| 5,210,774 | 5/1993 | Abbiate et al. | 375/14 |
| 5,293,401 | 3/1994 | Serfaty | 375/14 |
| 5,311,546 | 5/1994 | Paik et al. | 364/724.2 |

FOREIGN PATENT DOCUMENTS 0524559  1/1993  European Pat. Off. ............ 375/14

OTHER PUBLICATIONS

European Search Report dated Feb. 13, 1995, regarding EPO application No. EP 94 30 8235.
EP-A-0 235 300 published Sep. 09, 1987. Listed as particularly relevant if taken alone as to claims 1-7, 9 and 13 on European Search Report regarding EPO application EP 94 30 8235.
Patent Abstracts of Japan, vol. 14, No. 2 (E-868) Jan. 8, 1989, and JP-A-01 251 970 Oct. 6, 1989. Listed as particularly relevant if taken alone as claims 1-3, 5, 9 and 13 on European Search Report regarding EPO application EP 94 30 8235.
EP-A-0 055 922 published Jul. 14, 1982. Listed as particularly relevant if taken alone as to claims 1,2,6,7,9 and 13 on European Search Report regarding EPO application EP 94 30 8235.
J. D. Wang and J. J. Werner, Twenty-Second Annual Asilomar Conference on Signals, Systems, and Computers, Session MP3: "Communications Applications" in Pacific Grove, California, *On The Transfer Function of Adaptive T/4 Equalizers*, Nov. 1, 1988, Maple Press. Comments: The submitted document is provided for background purposes and, more specifically, for its disclosure of false convergence states.

*Primary Examiner*—Stephen Chin
*Assistant Examiner*—Jeffrey W. Gluck
*Attorney, Agent, or Firm*—S. R. Bartholomew; J. J. Trainor

[57] ABSTRACT

An adaptive circuit is used in the process of recovering data from a signal received from a communications channel. This circuit scripts or varies its transfer function in response to a first error signal derived from the received signal. This adaptation results in the device's transfer function settling to a converged state. An auxiliary information recovery circuit receives the recovered data and derives auxiliary information therefrom. To avoid the problem of false state convergence, the auxiliary information circuit provides a second error signal which causes the adaptive device to reinitiate the adaptation process. In the disclosed embodiment, the adaptive circuit is an equalizer and the auxiliary information recovery circuit is one which recovers framing information or is an error correction circuit. The inability of the auxiliary information circuit to function properly is used as an indication of false convergence of the adaptive circuit.

1 Claim, 1 Drawing Sheet

5,511,092

DATA RECOVERY TECHNIQUE WHICH AVOIDS A FALSE CONVERGENCE STATE

TECHNICAL FIELD

The present invention relates to technique for recovering data using an adaptive circuit and, more particularly, to such a technique which avoids convergence of the adaptive circuit to a false state.

BACKGROUND OF THE INVENTION

Adaptive circuits for purposes of this invention am those whose transfer function can be varied. The process of varying the transfer function can be performed in several ways. In one arrangement, the circuit initially operates with one or more parameters and the parameter values can be individually varied in a manner intended to improve circuit operation. In another arrangement, the circuit operates with an initial set of parameters and this entire set is changed for another parameter set upon some predetermined condition.

Digital receivers use adaptive circuits, such as equalizers, and those which provide timing recovery and/or carrier recover, in the regeneration of data from a received signal which has propagated through a communications channel. Within the receiver, the adaptive circuit provides a transfer function which compensates for the characteristics of the communications channel and thereby reduces errors in the data recovery process. Typically, each adaptive circuit varies its transfer function in response to a first error signal derived from the received signal.

The adaptation or adjustment of the transfer function of a circuit used in the data recovery process can be performed in two different arrangements. In "blind" adaptation, the circuit's transfer function is varied during reception of a signal conveying customer data whose value at any time is not known. In contrast, a training sequence including one or more a prod known data values can be transmitted in certain time intervals and the transfer function of the adaptive circuit is varied so as to minimize a first error signal. This first error signal at any time is equal to the difference between the recovered data value at that time and the corresponding a priori known transmitted data value.

There are several problems associated with the use of training sequences. First, the transmission of the training sequences requires an interruption in the transmission of customer data. Second, the use of training sequences alone does not provide adaptation during customer data transmission. Therefore, the adaptation is not continuous and the transfer function provided by the adaptive circuit does not track variations in the characterstics of the communications channel during customer data transmission. These characteristics may render adaptation solely in response to training sequences impractical in applications where the communications channel characteristics vary frequently. Third, if the adaptation process is to be performed at times other than during predesignated time intervals, such as system start-up, a communications channel must be provided from the receiver back to the transmitter in order to inform the latter to commence training sequence transmission.

The use of blind adaptation also has associated problems. A significant problem is that referred to as "false convergence". This situation arises in adaptive circuits in certain communications systems when the adaptive algorithm adjusts a circuit's transfer function to a "settled" state "believing" that circuit performance has been optimized when, in fact, it has not. In these situations, the system is referred to as having multiple solutions, one or more of which significantly improve circuit performance and one or more of which do not. This problem is troublesome and it would be desirable if a technique could be devised which overcomes the problem of false convergence in the recovery of data from a received signal.

SUMMARY OF THE INVENTION

In accordance with the present invention, an adaptive circuit is used in data recovery. This circuit adapts in response to a first error signal derived from a received signal containing customer data. This adaptation results in the circuit's transfer function settling to a converged state. Another circuit receives the output of the adaptive circuit and derives auxiliary information therefrom. To avoid the problem of false state convergence, this other circuit provides a second error signal which causes the adaptive circuit to reinitiate the adaptation process, if false state convergence occurs.

In the disclosed embodiment, the adaptive circuit is an equalizer and the other circuit is one which recovers framing information from the recovered data signal. The inability of the other circuit to recover framing is indicative of false convergence of the adaptive circuit. Advantageously, this technique is transparent to the transmitter and adaptation is reinitiated automatically without any need to couple signals from the receiver to the transmitter or for the transmitter to couple a priori known training sequences.

DETAILED DESCRIPTION

Figure 1:
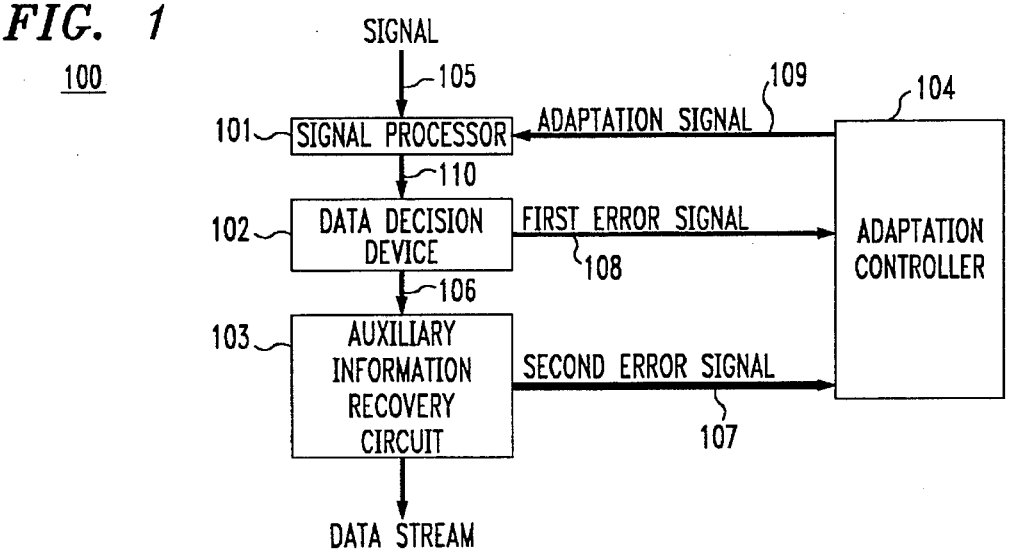
FIG. 1 is a block-schematic diagram of an illustrative embodiment of the present invention.

In the illustrative embodiment of the present invention shown in FIG. 1, system 100 invention includes signal processor 101, data decision device 102, auxiliary information recovery circuit 103, and adaptation controller 104. A signal received from a communications channel is coupled to signal processor 101 via bus 105. For purposes of this application, a bus includes one or more signal-carrying leads. This signal conveys a digital data signal and the data may originate from a variety of sources, such as data terminals, video and/or facsimile equipment. The communication channel through which the digital data signal is coupled can include a variety of media including wire, optical fiber, cellular wireless, and/or noncellular wireless. The digital data signal coupled to the signal processor can be of one or more dimensions depending on the transmitted signal format. For example, in systems utilizing a baseband pulse amplitude modulation, the input signal to the signal processor is one-dimensional while in systems utilizing quadrature amplitude modulation (QAM), the input signal to the signal processor is multi-dimensional.

As will be discussed in further detail hereinafter, the arrangement of the signal processor, data decision device, and adaptation controller serves to recover the data from the received signal. The signal processor includes one or more well-known adaptive circuits which provide a variety of functions, depending on the particular system application.

These functions include distortion compensation, carrier recovery and timing recovery. The output of the signal processor is coupled to the data decision device 102 which, in turn, provides the recovered digital data signal on bus 106. This digital data signal is coupled to auxiliary information signal recovery circuit 103 which recovers auxiliary information from the recovered digital data signal.

Data decision device compares the output of the signal processor to one or more reference signals and quantizes the signal processor output to the closest one of the reference signals. Each of these reference signals corresponds to a different one of the permissible transmitted digital data signal levels. A by-product of the quantization provided by data decision device 102 is the generation of a first error signal on bus 108. This first error signal is equal to the difference between the value of the signal processor output and the closest one of the reference signals. Lead 108 couples the first error signal to adaptation controller 104.

In accordance with the present invention, the auxiliary information recovery circuit provides a second error signal on bus 107 which is coupled to the adaptation controller. The controller in conventional fashion adapts the adaptive circuitry within the signal processor by providing signals on bus 109 which are generated in response to the first error signal on bus 108. This adaptation process begins from a predetermined initial state corresponding to a predetermined set of adaptation signals on bus 109. The signals on bus 109 vary in accordance with any of a number of well-known schemes until the first error signal on bus 108 meets a predetermined criterion. Typically, this criterion is that the first error signal on bus 108 does not exceed a predetermined amount. Once this amount is not exceeded, the adaptive circuit is said to have "converged" and while adaptation continues, variations in the circuits transfer function are quite small. Now, pursuant to the present invention, controller 104 will recommence adaptation of an adaptive circuit in signal processor 101 upon receiving the second error signal on bus 107. Adaptation is recommenced from an initial state which may be the same or different from the initial state used previously.

The signal processor 101 can be implemented in a variety of forms and the particular form is not crucial. Whatever the implementation, the signal processor must include an adaptive circuit whose adaptation is accomplished by varying one or more circuit parameters.

Figure 2:
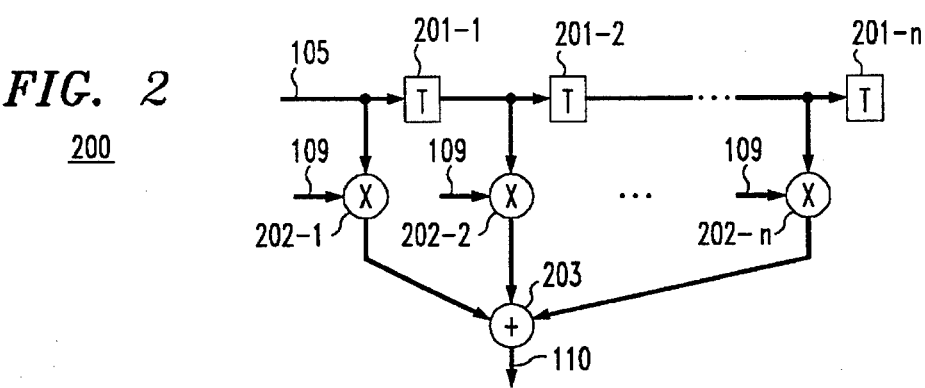
FIG. 2 is a block-schematic diagram of adaptive circuitry within the signal processor 101 shown in FIG. 1.

Refer now to FIG. 2 which shows an illustrative adaptive circuit within signal processor 101. Digital filter 200 includes a tapped delay line which utilizes a plurality of delay elements 201-1 through 201-n, where n is a predetermined integer. In well-known fashion, filter 200 provides an output on bus 110 by multiplying each of the received signal values in the delay line by an associated coefficient. Each associated coefficient is supplied to a different one of multipliers 202-1 through 202-n. Bus 109 provides the coefficients to each multiplier. These coefficients are generated within adaptation controller 104 using any of a number of well-known algorithms including least mean square (LMS), zero-forcing (ZF), or any of the derivatives of these algorithms. Adder 203 combines the outputs of the multipliers to form the filter output signal on bus 110.

Referring back to FIG. 1, auxiliary information signal recovery circuit 103 performs the functions needed to pass the digital data on bus 106 to other circuits (not shown). This auxiliary information varies with the system application and may include framing, cell delineation, and/or a variety of error correction schemes, such as parity, cyclic redundancy checksums, etc. The inability of circuit 103 to operate in its intended manner in the present invention is used as an indication of the adaptive circuit within the signal processor being converged to a false state. Accordingly, at such times, the second error signal is provided on bus 107.

Figure 3:
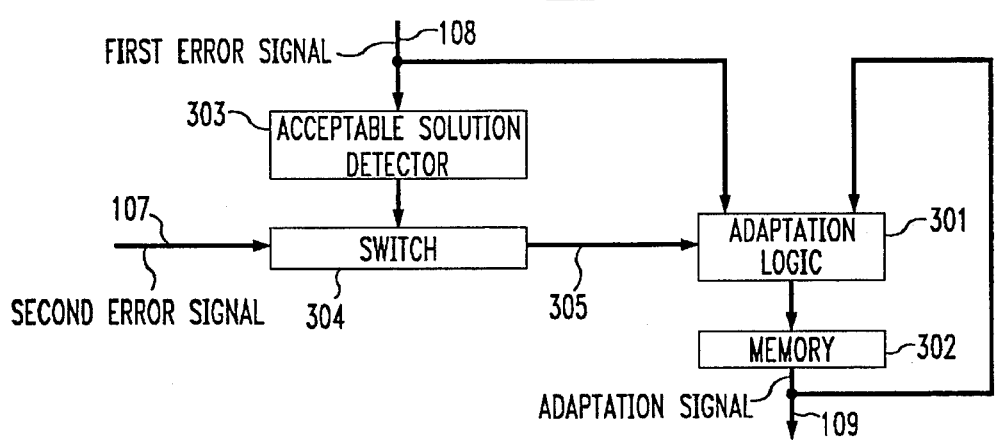
FIG. 3 is a block-schematic diagram of the adaptation controller 104 in FIG. 1.

FIG. 3 shows a block-schematic diagram of circuitry within controller 104. As shown in FIG. 3, the first error signal on bus 108 is coupled to adaptation logic 301 and acceptable solution detector 303. The adaptation logic uses the first error signal and the current values of the signals on bus 109 stored in memory 302 to form updated signals for bus 109.

The acceptable solution detector 303 compares the value of the first error signal on bus 108 to a predetermined amount and determines whether the value of the first error signal is less than the predetermined amount for a specified time interval. When this condition is reached, detector 303 causes switch 304 to couple bus 107 to bus 305. Logic 301 will then recommence the adaptation process when the logic state of the second error signal on bus 305 has a predetermined value.

Recommencing of the adaptation process can be provided in a number of ways. Since most of the adaptation algorithms modify the signals on bus 109 based on a mathematical function of the first error signal on bus 108 and the current value of the signals on bus 109, recommencing adaptation can be done by updating the current values of the signals on bus 109. Or, recommencement may be provided by repeating the adaptation process using the same initial signals on bus 109 which were used at commencement of the previous adaptation. Or, adaptation can be reinitiated using a different adaptation algorithm from what was used for the prior adaptation. A preferable arrangement in the disclosed embodiment is to feed the current values of the coefficients in FIG. 2 to a different multiplier. For example, if a coefficient, prior to adaptation recommencement, is coupled to multiplier 201-i, where i is an integer between 1 and n−1, upon adaptation recommencement, this coefficient is coupled to multiplier 201-(i+1). This causes each coefficient to be shifted from its present multiplier to one multiplier to the right of its previous multiplier. The coefficient coupled to multiplier 201-n can be coupled back to multiplier 201-1 or, the coefficient coupled to multiplier 201-n, prior to adaptation recommencement, can be dropped and a 0 value coefficient coupled to multiplier 201-1 . Alternatively, the coefficient, coupled to any multiplier, can upon recommencement be coupled to a multiplier one position to the left of the multiplier to which it is coupled immediately prior to adaptation recommencement. Of course, shifting of the coefficients to the right or left using offsets other than one multiplier position are also possible. Implementation of any of these alternatives can be readily accomplished by modification of the operation of adaptation logic 301 and memory 302. In any event, once adaptation is recommenced, it continues until the first error signal on bus 108 meets the predetermined criterion.

It should, of course, be noted that while the present invention has been described in reference to an illustrative embodiment, other arrangements may be apparent to those of ordinary skill in the art. For example, while the disclosed embodiment utilizes discrete devices, these devices can be implemented using one or more appropriately programmed, general-purpose processors or special-purpose integrated circuits or digital processes or an analog or hybrid counterpart of any of these devices.

We claim:

1. Apparatus for use in a communications system wherein a signal containing data is received from a communications channel, said apparatus comprising:

adaptive means for recovering the data from said received signal, said means having a transfer function which is varied from a first initial state in response to a first error signal;

means for recovering auxiliary information from the recovered data, said auxiliary information recovering means providing a second error signal when it is unable to recover said auxiliary information;

said adaptive means reinitializing a variation of said transfer function from a second initial state in response to said error signal;

wherein said adaptive means is an adaptive equalizer having a plurality of multipliers, each multiplier being associated with a different coefficient, such that, in said first initial state, each coefficient in a set of coefficients is associated with a different one of said multipliers, and in said second initial state, each coefficient in a predetermined portion of said set is associated with a multiplier which is different from that in said first initial state.

* * * * *